3,510,264
APPARATUS FOR PRODUCING PHOSPHATES
James P. Sprigg, 5233 Randolph St.,
Los Angeles, Calif. 90022
Continuation-in-part of application Ser. No. 252,617,
Jan. 21, 1963. This application Oct. 12, 1967, Ser.
No. 674,986
Int. Cl. B01j 2/26
U.S. Cl. 23—259.2
3 Claims

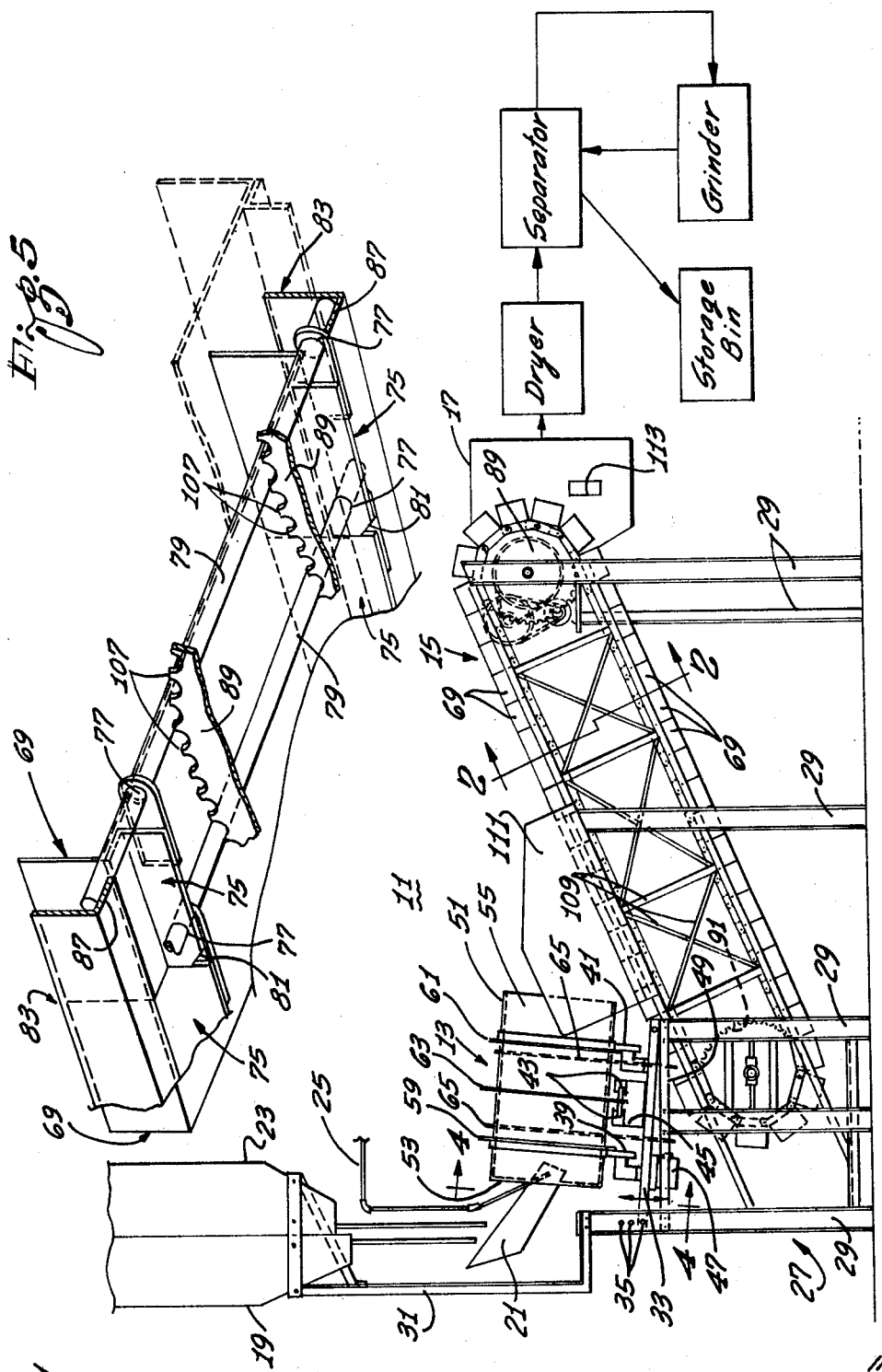

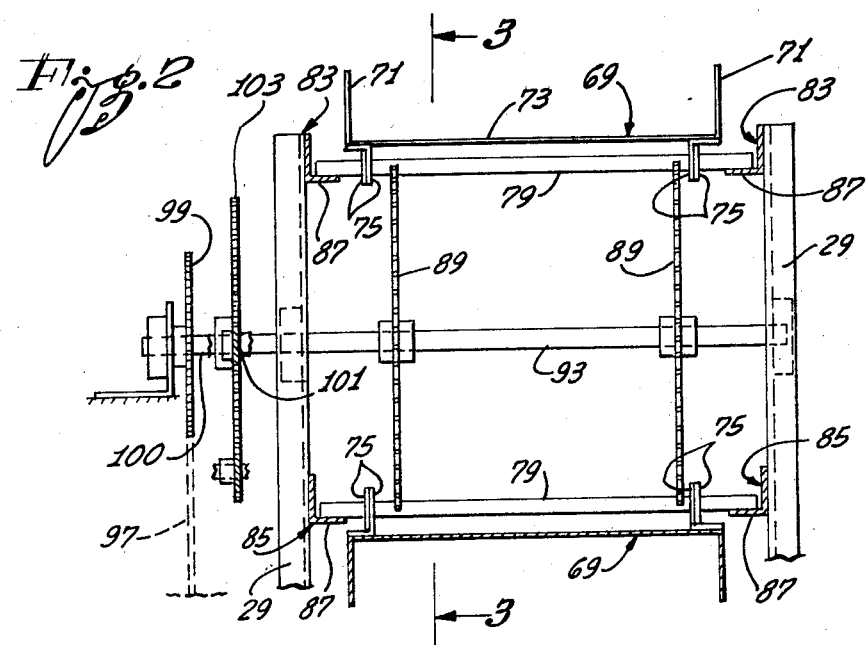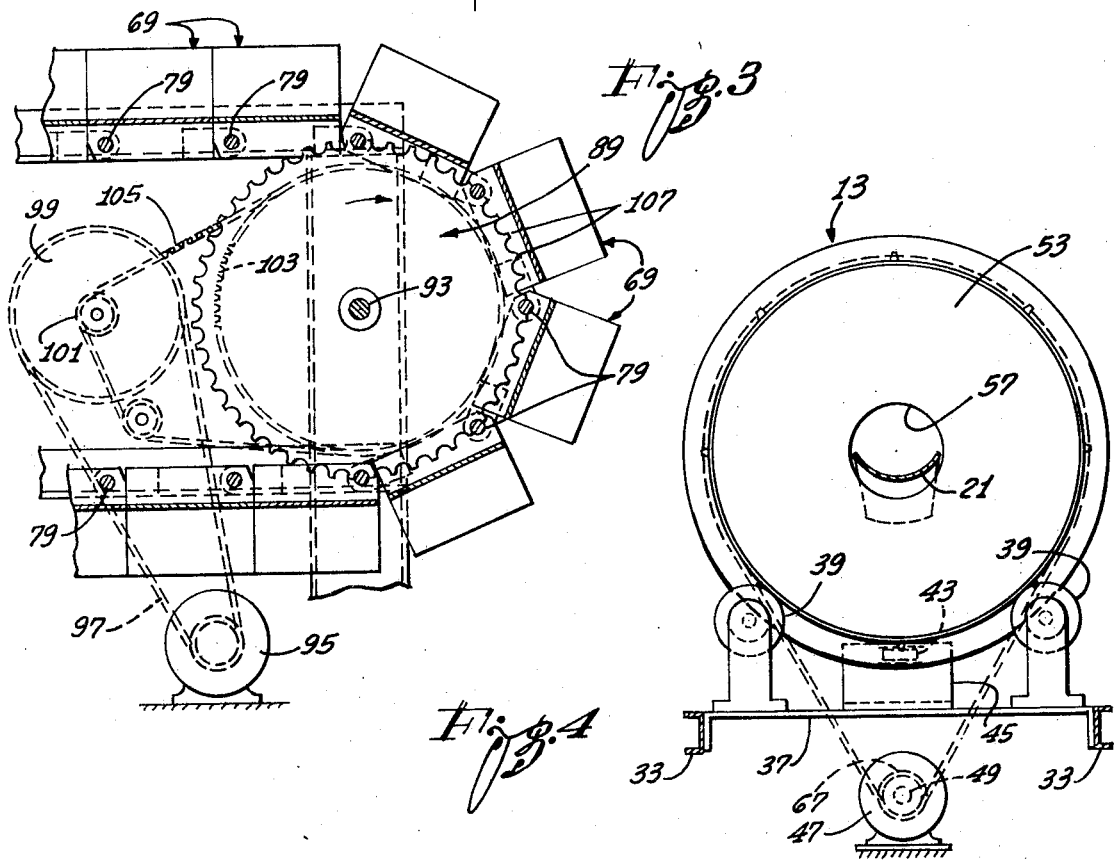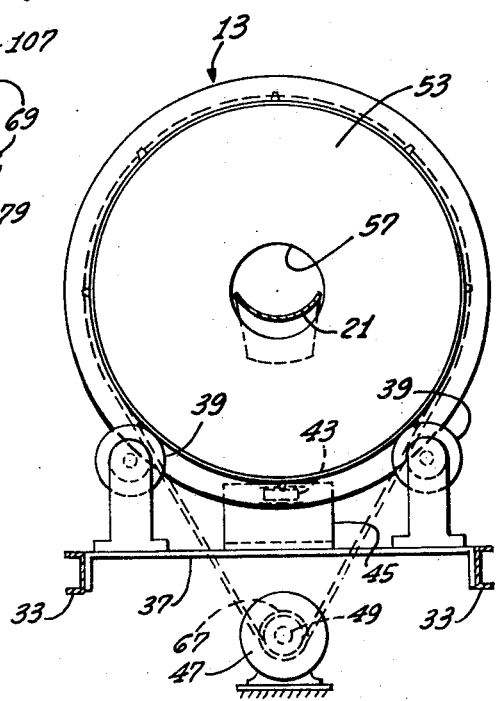

ABSTRACT OF THE DISCLOSURE

An apparatus for continuously producing phosphate includes a drum mixer which mixes the reactants and causes the mixed reactants to be placed on a conveyor having a plurality of conveyor sections arranged in an end-to-end relationship. The conveyor slowly transports the mixed reactants from the mixer to a dryer where the mixed reactants are broken into granules and dried.

BACKGROUND OF THE INVENTION

This application is a continuation-in-part of application Ser. No. 252,617 filed Jan. 21, 1963, now abandoned.

It is well known that animals such as cattle need phosphorous in order to grow properly and remain healthy and strong. Typically, phosphorous is provided as one of many feed ingredients. One way of providing phosphorous is in the form of a phosphate compound which includes phosphorous and one or more other elements which is also beneficial to the animal. For example, as calcium is desirable in the diet of many animals to insure a strong bone structure, it is common practice to provide the calcium and phosphorus together in the form of calcium phosphate. As is well known, calcium phosphate may take different forms such as monocalcium phosphate, dicalcium phosphate, tricalcium phosphate, or a mixture thereof.

In order that it can be readily mixed with the other ingredients of the feed, it is necessary that the phosphate be supplied in particulate or granulate form. Heretofore it has been relatively difficult and costly to produce phosphates in granular form because the phosphates were initially produced in the form of a very hard solid slab. The solid slab was then crushed in a special crushing apparatus and the crushed or pulverized phosphates were screened so that improper size granules could be rejected and/or recrushed. The need for a special crusher increases the cost of the process equipment, and the crushing and screening operations take additional time which lengthens the overall process time.

Another disadvantage of the prior art phosphate producing methods is that the chemical reaction time required to produce the phosphate is generally quite long. In a typical prior art process, phosphoric acid $H_3PO_4$ is slowly added to limestone $CaCO_3$ as by spraying to initiate a reaction which ultimately produces calcium phosphate. The reaction time to form the calcium phosphate takes several hours.

Still another disadvantage of prior art methods is that the phosphates are typically produced in individual batches rather than continuously. The batch method is not desirable in that it is much slower than continuous production of the desired product.

SUMMARY OF THE INVENTION

The present invention overcomes these disadvantages in providing a method and apparatus for continuously and rapidly producing phosphates. The continuous process is carried out in a short period of time and requires less than one hour. The present invention also eliminates the need for special crushing equipment to thereby reduce the cost of the production equipment and the time required for producing the phosphates.

Although the method and apparatus of this invention can be utilized in carrying out different processes, it is particularly adapted for producing phosphates. In particular, the method and apparatus of this invention are adapted for continuously carrying out the phosphate-forming reaction described and claimed in applicant's copending application Ser. No. 252,617, now abandoned.

The present invention teaches that the reaction time required for forming phosphates can be significantly reduced by quickly adding the required amount of phosphoric acid to a carbonate such as calcium carbonate and then intimately mixing the acid and carbonate to form a wet slurry which is thoroughly wet throughout. The thorough mixing provides intimate contact between the carbonate and the acid to thereby assure that the phosphate forming reaction will be initiated quickly and that virtually all portions of the carbonate will be immediately exposed to the acid. When this process is followed, a large percentage of the phosphate-forming reaction is completed within a few minutes.

As is well known, the reaction between phosphoric acid having a concentration of 85% and calcium carbonate produces hydrated dicalcium phosphate and carbon dioxide as shown below.

(1) 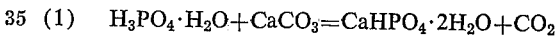 $H_3PO_4 \cdot H_2O + CaCO_3 = CaHPO_4 \cdot 2H_2O + CO_2$

As can be seen, there is no excess water produced in this reaction. It will be appreciated however that if the acid has a concentration less than 85%, excess water will be produced and the reaction cannot be completed until such excess water is disposed of. The present invention teaches that the reaction time can be considerably reduced by adding a base to the phosphoric acid and carbonate which has a high pH and which will react with the phosphoric acid to produce considerable heat. There are many bases which fall into this category among which are calcium oxide CaO, calcium hydroxide $Ca(OH)_2$, sodium hydroxide NaOH and ammonia $NH_3$. Although the various hydroxides can be used, they are not preferred because they also form some excess water, and to that extent, the use of hydroxides is self-defeating. It has been found that calcium oxide works very well and calcium oxide is the preferred. When phosphoric acid, having a concentration of 73% is added to both calcium carbonate and calcium oxide, the reaction set forth occurs.

(2) 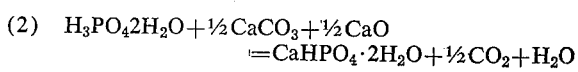 $H_3PO_4 2H_2O + \frac{1}{2}CaCO_3 + \frac{1}{2}CaO$
$= CaHPO_4 \cdot 2H_2O + \frac{1}{2}CO_2 + H_2O$ The selection of ½ mole each of calcium carbonate and calcium oxide is illustrative, the selection of specific proportions depending upon factors which are set forth below. The excess water produced in the reaction according to Equation No. 2 above, is rapidly boiled off by heat of reaction between the calcium oxide and the phosphoric acid to thereby significantly decrease the reaction time.

Virtually any carbonate compound can be utilized in the above described reaction; however, it is preferred to utilize a carbonate which is present with at least one other element which is also useful as a feed ingredient. Carbonates within this category include calcium carbonate $CaCO_3$, sodium carbonate $Na_2CO_3$, potassium carbonate $K_2CO_3$, cobalt carbonate $CoCO_3$, magnesium carbonate $MgCO_3$, and manganese carbonate $MnCO_3$. Because calcium is a highly desirable feed ingredient, calcium carbonate is often used and the present invention, for purposes of illustration, is described with reference thereto.

The carbonate in the above-described reaction forms carbon dioxide which travels through the slurry as the reaction progresses and creates many pores or voids therein. Thus, as the reaction moves toward completion, the phosphate mass dries and becomes porous. Porosity is desirable because a porous mass is easier to granulate than a dense nonporous phosphate mass. In this connection it is important that the acid and carbonate be briefly and thoroughly mixed in a tumbling type mixer to cause even and consistent escape of the carbon dioxide to thereby enhance porosity. In addition, the wet slurry should be left undisturbed after formation of the slurry to allow continued escape of the carbon dioxide in a manner that will cause the desired porosity and to prevent disturbing the pores which have already formed in the mass.

The present invention teaches that the above-described reactions and other similar reactions may be carried out more efficiently if done continuously rather than on a batch basis. To this end the reactants may be continuously introduced into a continuously operable mixer which continuously discharges the mixed reactants therefrom in the form of a wet slurry. The wet slurry is then left undisturbed to allow substantial completion of the reaction.

It is preferred to introduce phosphoric acid and a carbonate into a drum mixer having an opening therein and one wall inclined toward the opening to cause the acid and carbonate to flow toward such opening. If a heat producing base material is to be used, it is also simultaneously introduced into the drum mixer. The drum mixer is slowly rotated at, for example, 10 r.p.m. as the reactants are continuously introduced therein to thoroughly mix the reactants to form a wet slurry which is completely wet throughout to thereby initiate the reaction. The mixing should not be done violently as this prevents the formation of voids or pores in the mass. In order that the mixing time may be adjusted to suit the particular reactants and other conditions, the drum mixer is preferably pivotally mounted to thereby provide for adjusting the angle of incline thereof. The mixing time must be long enough so that the carbonate and base are intimately mixed with the acid to assure a rapid reaction, but must not be so long that the reactants dry or tend to form balls or chunks in the mixer.

The reactants in the form of a wet slurry ultimately fall through the opening in the drum mixer and onto a slowly moving reactor belt. As the slurry is quickly and continuously poured onto the reactor belt and the belt is moving slowly, the slurry forms a layer on the reactor belt. The reactor belt slowly moves the reacting layer toward one end thereof without disturbing the slurry to allow the carbon dioxide to travel through the phosphate to form voids therein. The present invention teaches adjusting the speed of the reactor belt so that when each segment of the layer reaches the end of the reactor belt, such segment is in the form of a porous, slightly moist phosphorous mass, the porosity of the mass being caused by the carbon dioxide traveling through and exiting from the mass. Each segment may remain on the reactor belt for a time which varies depending upon the atmospheric conditions around the reactor belt and the kinds and amounts of reactants that are used. However, it has been found that a period of 45 minutes is sufficient for most reactants and atmospheric conditions with a period of 30 minutes being typical.

At the end of this period, the first segment or portion of the layer reaches the end of the reactor belt and falls off of it into a collecting bin or a hopper. As will be readily appreciated, the slightly moist porous mass falls off of the reactor belt in a chunk which fractures and breaks up somewhat as it falls into the hopper. From the hopper, the chunk is fed into an agitating type dryer. The agitation should be gentle as harsh agitation will tend to cause the material to form hard, solid balls. A dryer of the slowly rotating type having flights, which elevate and drop or shower the materials is the most effective for this purpose, because the chunks of phosphate are porous, soft and slightly moist, the normal gentle agitating action of the dryer is sufficient to granulate the chunks. This eliminates the need for special crushing equipment. From the dryer, the granulated phosphate may be screened and ultimately stored for shipment.

If the phosphorous mass is completely dry or contains only a negligible amount of moisture when it is introduced into the dryer, it will be much too hard and the dryer will not be able to break up the mass, in which event a special crushing apparatus is required. On the other hand, if the mass is placed into the dryer before it has dried sufficiently, the phosphorous mass will tend to form moist coherent balls in the dryer and will not be granulated to the proper size. It is important therefore that the phosphorous mass be placed into the dryer when it contains the proper amount of moisture. It has been found that the phosphorous mass should contain between 3 and 15% moisture on a weight basis when it is introduced into the dryer, with the range of 5 to 10% water being preferred and with 7 or 8% moisture being considered optimum.

The present invention also teaches the use of a reactor belt which includes a plurality of pivotally interconnected reactor or conveyer sections interlinked to form an endless belt. The conveyer sections are pivotally interconnected by a transversely extending elongated member such as rods which may extend through straps on the interior of the conveyer. A driving sprocket is provided on the interior of the endless belt. The sprocket has peripheral teeth which are spaced and sized to mesh with at least some of the rods to thereby impart a driving movement to the conveyer. The rods may also be used for supporting a section of the conveyer by providing a suitable guide or track on which the rods may bear as they move through such sections of the conveyer. It will be readily appreciated that a conveyer or reactor belt so constructed will have uses apart from the particular process described herein.

The invention, both as to its organization and method of operation together with further features and advantages thereof may best be understood by reference to the following description taken in connection with the accompanying illustrative drawings.

BRIEF DESCRIPTION OF THE DRAWINGS

FIG. 1 is a partially schematic side elevational view of an apparatus constructed in accordance with the teachings of this invention.

FIG. 2 is an enlarged sectional view taken along line 2—2 of FIG. 1 and showing a detail of the conveyor or reactor belt.

FIG. 3 is a sectional view taken along line 3—3 of FIG. 2 and showing other details of the conveyer.

FIG. 4 is an end elevational view partially in section taken along line 4—4 of FIG. 1 and illustrating the drum mixer.

FIG. 5 is a perspective view showing how the rods pivotally interconnect adjacent conveyer sections.

DESCRIPTION OF THE PREFERRED EMBODIMENTS

In order that the present invention may be best understood, the chemical reactions, which are typical of the type that may be carried out with the method and apparatus of this invention, are first described herein.

As explained hereinabove, a high heat producing base is only necessary to speed up the reaction when the reaction produces an excess amount of water. As illustrated by Equation No. 1 above, it is possible to produce dicalcium phosphate without producing excess water by utilizing phosphoric acid having a concentration of 85%. Although phosphoric acid of this concentration reacts very well with the carbonate, concentration of phosphoric acid over 80% are considerably more expensive than a concentration of 75–80%. Thus, for economic reasons it is preferred to utilize an acid having a concentration of 80% or less. As can be seen from Equation No. 2 above, the use of phosphoric acid having a concentration of 73% produces excess water which must be boiled off. Accordingly, in actual practice of the invention, it is usually desirable to utilize the high heat producing base material.

The relative amounts of carbonate and heat producing base can be varied depending upon the amount of excess water that is produced in the reaction and depending upon the atmospheric conditions. Normally, the reaction described herein is carried out at ambient pressure, temperature, and relative humidity. The amount of excess water depends upon the relative proportions of carbonate and acid that are used. It has been found that mixing from 1 to 9 moles of carbonate with 9 to 1 moles of heat producing base, i.e. 10% to 90% carbonate and 90% to 10% heat producing base produces satisfactory results. As the carbonate is needed to produce carbon dioxide, it is preferred that the dry mixture include at least 50% of carbonate on a mole basis. As the concentration of the acid is reduced, more of the high heat producing base must be added to boil off the additional excess water, and in order to insure that the amount of carbonate can be held at a miximum, it is preferred to utilize an acid having a concentration of from 73% to 85%. The amount of acid that is added to the dry mixture will vary depending upon the form of phosphate that it is desired to produce. As illustrated by Formulas Nos. 1 and 2 above, dicalcium phosphate is formed by adding one mole of phosphoric acid to one mole of dry mixture, i.e. carbonate and/or high heat producing base.

Monocalcium phosphate can be produced by increasing the amount of phosphoric acid as shown in the equation given below in which the phosphoric acid has a concentration of 85%.

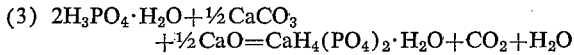

(3) $2H_3PO_4 \cdot H_2O + \frac{1}{2}CaCO_3 + \frac{1}{2}CaO = CaH_4(PO_4)_2 \cdot H_2O + CO_2 + H_2O$ Similarly tricalcium phosphate can be formed utilizing phosphoric acid having a concentration of 85% as illustrated below.

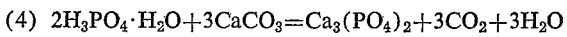

(4) $2H_3PO_4 \cdot H_2O + 3CaCO_3 = Ca_3(PO_4)_2 + 3CO_2 + 3H_2O$

In forming tricalcium phosphate, the heat producing base can often be eliminated because the carbonate creates enough heat to boil off the water formed in this reaction. Of course, mixtures of the three types of calcium phosphate can be produced by varying the acid to carbonate ratio. Of course, similar reactions to those described above occur when other types of carbonates and heat producing bases are utilized.

Preferably the carbonate is supplied in granular form and may have a mesh size of from 14 to 100 with 16 to 30 mesh being preferred. The relatively large granules of carbonate insure that the carbon dioxide will be released relatively slowly to produce relatively large pores in the phosphate mass. The phosphate granules become finer as the particle size of the carbonate decreases. This assures that the phosphate ultimately produced after the drying operation will be granular rather than powdery, the granular form being preferred for feed usage. On the other hand, it is preferred to utilize a relatively fine or powdery producing base such as calcium oxide. The fine calcium oxide assures that a rapid high heat producing reaction will occur. Increasing the amount of the fine heat producing base will tend to decrease the size of the phosphate granules. For this reason it is preferred that the heat producing base be held to a minimum. By way of example, one form of calcium oxide which works very well has the following analysis: 99% passes the 100 mesh screen, 96% passes a 150 mesh screen, 94% passes a 200 mesh screen, and 76% passes a 350 mesh screen.

Turning now to the drawings and in particular to FIG. 1 thereof, reference numeral 11 designates an apparatus for producing phosphates constructed in accordance with the teachings of this invention. Generally the apparatus includes a rotatable drum mixer 13, a movable reactor belt or conveyer 15 and a hopper 17 disposed beneath one end of the reactor belt. A dryer, separator, grinder, and storage bin are disposed downstream of the hopper 17. These last mentioned items of equipment are suitably connected by chutes, conveyers, or other suitable material handling devices.

A feeder 19 which may be of the vibratory type supplies metered amounts of granular carbonate such as calcium carbonate to a suitably mounted chute 21 which is inclined downwardly toward the mixer 13 to provide gravity flow of the carbonate into the mixer. A second feeder 23, which may be of the screw type, supplies calcium oxide or another heat producing base to the chute 21. A screw type feeder is preferred for the calcium oxide because it is finer than the granular carbonate. If desired, the feeders 19 and 23 may be remote from the chute 21 and they may supply their respective ingredients to a conveyer which would transport these ingredients to the chute 21. Also leading into the mixer 13 is an acid supply line 25 which may inject acid continuously to the downstream end of the chute or directly into the mixer 13. The acid may be supplied in controlled amounts by a constant speed pump (not shown).

A suitable frame 27 provides supporting structure for the feeders 19 and 23, the mixer 13, and the reactor belt 15. Although the frame 27 may take many forms, in the embodiment illustrated it includes a plurality of upright beams 29 which may be interconnected by suitable cross members (not shown). The feeders 19 and 23 are supported by a platform section 31 of the frame 27.

The mixer 13 can be supported on the frame 27 in any manner that will allow limited pivotal movement thereof about a transversely extending axis. In the embodiment illustrated, a pair of spaced parallel support members 33 (FIGS. 1 and 4) are pivotally mounted at their forward ends to a pair of the upright beams 29 for pivotal movement about a transverse axis. The rear end of each of these support members 33 is releasably secured in one of several vertically spaced apertures 35 (FIG. 1) in another pair of the upright beams 29 by suitable means such as a bolt (not shown). Thus, the support members 33 and anything connected thereto may be tilted to several different positions about a transversely extending axis by utilizing different ones of the apertures 35 in the pair of upright beams 29.

One or more transverse members, which may be in the form of a plate 37 (FIG. 4), extends transversely between and is secured to the support members 33. Suitably mounted on the plate 37 are two pairs of supporting rollers 39 and 41 and a pair of guide rollers 43. The guide rollers are mounted for rotation about upright axes by a channel member 45 which is rigidly affixed to the plate member 37. An electric motor 47 is suitably suspended from the plate member 37 and drives a drive shaft 49.

The mixer 13 is preferably in the form of drum or barrel and includes an elongated generally cylindrical, peripheral wall 51, an end wall 53, and an open or at least partially open end defining an opening 55. As best seen in FIG. 4, the end wall 53 has a central circular aperture 57 therein through which the chute 21 and acid line 25 extend. A pair of annular members 59 and 61 of angle-shaped cross section are mounted on the peripheral wall 51 and form tracks for receiving the pairs of rollers 39 and 41, respectively. The tracks formed by the annular members 59 and 61 mount the mixer 13 for rotation about the longitudinal axis thereof and support the mixer with the longitudinal axis inclined relative to the horizontal. To further guide the rotational movements of the mixer 13, a peripheral flange 63 is secured to the peripheral wall 51 and extends between the confronting guide rollers 43.

The mixer 13 is rotated by a pair of continuous flexible members 65 which may be in the form of chains which extend completely around the peripheral wall 51 in frictional contact therewith. Each of the flexible members 65 is driven by a suitable pulley 67 which is drivingly connected to the drive shaft 49.

With the mixer 13 thus mounted, the peripheral wall 51 and the axis of rotation, which coincides with the longitudinal axis of the mixer, are inclined downwardly toward the opening 55. This angle of incline can be varied by moving the rear ends of the support members 33 to others of the apertures 35 in the upright beams 29.

By way of example, it has been found that an angle of incline of about 15° works satisfactorily for many of the reactants supplied to the mixer. A rotational speed of about 10 r.p.m. has also been found satisfactory. All of the reactants are simultaneously and continuously fed into the elevated end of the mixer 13 and they flow downwardly toward the opening 55 while the mixer is slowly rotating to mix the reactants. The angle of incline of the mixer 13 should be adjusted so that the reactants form a wet slurry which is completely wet throughout by the time they reach the opening 55. It has been found that a mixing time of from about 20 seconds to 1 minute is sufficient for most reactants and that a period of about 30 seconds is generally optimum.

The reaction begins in the mixer 13 and it is important that the slurry be allowed to exit through the opening 55 before the reaction is nearing completion or before the slurry becomes sufficiently dried and sticky so that it tends to form balls as it is rotated in the mixer. On the other hand, the reactants should not be allowed to exit through the opening 55 until the reactants are thoroughly mixed and the wet slurry is formed to initiate the reaction.

The reactor belt 15 is positioned beneath the opening 55 in the mixer 13 so that the wet slurry can continuously or at least substantially continuously exit from the opening and fall onto the reactor belt. The reactor belt 15 moves slowly toward the hopper 17 to allow the reaction to continue thereon. By the time that the slurry reaches the end of the reactor belt 15 adjacent the hopper 17, the reaction has progressed to the extent that all or substantially all of the $CO_2$ has left the reacting mass to thereby form a porous phosphate mass, and, as described above, only about 5 to 10% of the moisture on a weight basis remains in the phosphate mass. The speed of the reactor belt must be adjusted to obtain this result.

The specific details and features of the reactor belt 15 are shown in FIGS. 1–3 and 5, it being understood that the reactor belt 15 may have uses apart from the particular process described herein. The reactor belt 15 includes a plurality of conveyer sections 69 which are disposed in closely adjacent end-to-end relationship. As best seen in FIGURE 2, each of the conveyer sections 69 is generally channel-shaped and includes a pair of vertical flanges 71 interconnected by a web or plate member 73 on which the slurry is deposited. A pair of longitudinally extending spaced parallel straps 75 are suitably secured as by welding to the inner face of the web 73. As shown in FIG. 5, the straps extend longitudinally beyond one transverse edge of its respective conveyer section 69. Each of the ends of the strap 75 has an aperture 77 extending therethrough with the apertures of adjacent straps 75 being in registry to allow the insertion of an elongated member or rod 79 therethrough. The rod 79 pivotally interconnects the adjacent conveyer sections 69. To prevent the straps 75 from interfering with the operation of the reactor belt 15 as they go around the ends of the reactor belt, a corner of each of the straps may be relieved as shown at 81 in FIG. 5.

Two pair of angle members 83 and 85 are mounted on the upright beams 29 and extend longitudinally for the full length of the reactor belt 15. One flange 87 of each of the angle members 83 and 85 extends inwardly and provides a supporting surface for the longitudinally extending sections of the reactor belt 15. As best shown in FIG. 2, the end portions of the rods 79 extend transversely beyond the straps 75 and are supported for sliding movement on the flanges 87. The members 83 serve to support the conveyer sections 69 moving away from the mixer 13 and the members 85 support the conveyer sections moving toward the mixer. The end portions of the rods 79 slide along the flanges 87 to support the reactor belt 15 and the material thereon.

The reactor belt 15 is a continuous endless belt and the end portions thereof are supported by drive sprockets 89 and by a pair of idler sprockets 91 adjacent the mixer 13. The drive sprockets 89 are mounted on a drive shaft 93 which in turn is suitably rotatably mounted in bearings in an adjacent pair of the upright beams 29. The drive shaft 93 is driven by an electric motor 95, a chain 97, sprocket 99, stub shaft 100 and a small drive sprocket 101. The sprocket 101 drives a larger sprocket 103 through a suitable flexible drive member 105. The sprocket 103 is affixed to the drive shaft 93 to thereby permit driving of the sprockets 89. The speed of movement of the reactor belt 15 can be changed by utilizing a different gear ratio or by utilizing a variable speed of an electric drive motor.

As best seen in FIG. 3, each of the drive sprockets 89 has a plurality of teeth 107 formed in the periphery thereof, which are spaced and sized to mesh with the rods 79 to thereby drive the reactor belt 15. The idler sprockets 91 similarly mesh with the rods 79. Thus, the rods 79 perform three important functions, namely, pivotally joining adjacent conveyor sections 69 supporting the longitudinal sections of the reactor belt 15 by riding along the flanges 87, and providing, in effect, a driven chain or gear for meshing with the drive sprocket 89 to drive the reactor belt 15. The reactor belt 15 is of very simple construction because of the numerous functions performed by the rod 79 and is also capable of conveying heavy material.

The reactor belt 15 may also include braces such as the braces 109 shown in FIG. 1 and a splash shield 111 also shown in FIG. 1 for preventing splashing of wet slurry as it falls through the opening 55. Of course, the reactor belt 15 could transport the slurry horizontally or downwardly rather than upwardly to the hopper 17, if desired.

As the reactor belt moves slowly, porous slightly moist chunks 113 intermittently fall off of the discharging end of the reactor belt 15 and into the hopper 17. The chunks 113 can then fall by gravity, be hand fed, conveyed, conveyed, or otherwise moved into the dryer. Although any dryer which produces a gentle agitating action may be used, it is preferred to utilize a rotating gas dryer having flights therein which will work the porous slightly moist chunks 113 sufficiently to granulate same.

When the phosphate has been dried, it is suitably transported to a separator such as a screen type separator, which grades the granular phosphate as to size. All of the granular phosphate that falls within the allowable size range is then allowed to flow by gravity into the storage bin. Minor portions of the bulk granular phosphate that do not pass through the screen are transmitted to a grinder, following which the ground particles are returned to the separator. Only a minor proportion of the phosphates will require grinding and such grinding is required only because the granules are slightly oversize rather than because the phosphate is supplied in huge chunks. The usual dust collecting fans may be utilized, if desired.

The invention may be further understood by reference to the following specific example. Phosphoric acid having a concentration of 80% was continuously metered into a drum mixer at the rate of 62 pounds per minute. Simultaneously, calcium carbonate and calcium oxide were continuously metered into the drum mixer at the rates of 25 pounds per minute and 14 pounds per minute, respectively. The mixer was continuously rotating at about 10 r.p.m. and was inclined downwardly toward the opening therein at an angle of about 15°. The reactants were thoroughly mixed mixed to form a wet slurry as they moved downwardly along the peripheral wall of the drum toward and through the opening therein. With the mixer so arranged, the mixing time was about 30 seconds for each incremental portion of the reactants. The slurry was dropped onto a slowly and continuously moving reactor belt and allowed to remain there undisturbed for a period of about 30 minutes after which it dropped off of the end of the reactor belt. When the slurry reached the end of the reactor belt, a reaction had been substantially completed to form a porous, slightly moist, phosphate mass having about 7 to 8% of water therein on a weight basis. The mass broke up into chunks as it fell into a hopper and from there it was delivered to a rotating gas dryer which dried and granulated the phosphate. The phosphate was then sized and stored and no grinding thereof was necessary except for a minor portion of oversized granules.

Although exemplary embodiments of the invention have been shown and described, many changes, modifications, and substitutions may be made by one having ordinary skill in the art without necessarily departing from the spirit and scope of this invention.

What I claim is:

1. In an apparatus of the character described, the combination of:

a drum mixer having an opening therein;

said mixer having a wall inclined to the horizontal to tend to cause said reactants to flow along said wall toward said opening;

means for rotating said mixer about a horizontal axis to mix the reactants and to allow flow thereof along said wall and through said opening;

means for adjusting the incline of said wall to adjust the rate of flow of the reactants along said wall to thereby adjust the time that the reactants are mixed in said mixer;

slow moving conveyor means beneath said opening of said drum on which the material passing through said opening is deposited, said conveyer means transporting the reactants to one end thereof, said conveyor means including a plurality of conveyer sections arranged in end-to-end relationship to form a substantially continuous belt means, each of said conveyer sections including a plate member for supporting the reactants and a channel section with said plate member defining the web of said channel and strap means secured to said plate member on the interior of said belt means and having an aperture therein in registry with an aperture in the strap means of the adjacent conveyer section, a plurality of rods, each of said rods being exposed on the interior of said belt means and extending through said apertures in said strap means to thereby pivotally interconnect the conveyer sections, a drive sprocket being positioned on the interior of said belt means and having a plurality of teeth on the periphery thereof drivingly engageable with said rods to drive said conveyer means; and dryer means for receiving the reactants when they have left said one of said conveyor means and drying the reactants to form dried material.

2. In an apparatus of the character described, the combination of:

a drum mixer having an opening therein;

said mixer having a wall inclined to the horizontal to tend to cause said reactants to flow along said wall toward said opening;

means for rotating said mixer about a horizontal axis to mix the reactants and to allow flow thereof along said wall and through said opening;

means for adjusting the incline of said wall to adjust the rate of flow of the reactants along said wall to thereby adjust the time that the reactants are mixed in said mixer;

slow moving conveyer means beneath said opening of said drum on which the material passing through said opening is deposited, said conveyer means transporting the reactants to one end thereof, said conveyer means including a plurality of conveyer sections arranged in end-to-end relationship to form a substantially continuous belt means, each of said conveyer sections including a plate member for supporting the reactants, a plurality of rods for pivotally interconnecting adjacent conveyer sections, support members extending longitudinally along an intermediate section of said belt means, said rods being adapted to slidably engage said support members to thereby support the intermediate section of said belt means, and a drive sprocket having a plurality of teeth on the periphery thereof drivingly engageable with said rods to drive said conveyer means; and dryer means for receiving the reactants when they have left said one of said conveyer means in drying the reactants for form dried material.

3. In an apparatus of the character described, the combination of:

a drum mixer having an opening therein;

means for supplying reactants to said mixer;

said mixer having a wall inclined to the horizontal to tend to cause said reactants to flow along said wall toward said openings;

means for rotating said mixer about a horizontal axis to mix the reactants and to allow flow thereof along said wall and through said opening;

slow moving conveyor means beneath said opening of said drum on which the material passing through said opening is deposited, said conveyor means including a plurality of conveyor sections arranged in an end-to-end relationship to form an endless belt means, each of said conveyor sections including a plate member for supporting the material and a pair of vertical flange members interconnected by said plate member for confining the material to said belt means, rod members transversely extending beneath said plate members and pivotally interconnecting said conveyor sections, support means extending longitudinally along an intermediate section of said belt means, said rod members being adapted to slidably engage said support means to support said belt means, and a rotatably mounted sprocket drive wheel having a plurality of teeth on the periphery thereof spaced and sized to drivingly engage said rod members.

References Cited

UNITED STATES PATENTS

| | | | |
|---|---|---|---|
| 1,659,794 | 2/1928 | Weihe | 23—269 |
| 2,598,658 | 5/1952 | Procter et al. | 71—37 |
| 2,603,556 | 7/1952 | Miller | 23—286 |
| 2,927,342 | 3/1960 | Dasher | 23—286 |

FOREIGN PATENTS

| | | |
|---|---|---|
| 1,001,640 | 1/1957 | Germany. |
| 561,616 | 10/1932 | Germany. |
| 9,938 | 2/1956 | Germany. |

JAMES H. TAYMAN, Jr., Primary Examiner

U.S. Cl. X.R.

23—105, 260, 286; 34—108; 71—37, 43; 198—196